United States Patent [19]

Kunz et al.

[11] Patent Number: 5,076,815

[45] Date of Patent: Dec. 31, 1991

[54] PROCESS FOR PRODUCING SINTERED MATERIAL BASED ON ALUMINUM OXIDE AND TITANIUM OXIDE

[75] Inventors: Reiner Kunz, Waldshut-Tiengen, Fed. Rep. of Germany; Konrad Kampfer, Thayngen, Switzerland

[73] Assignee: Lonza Ltd., Gampel/Valais, Switzerland

[21] Appl. No.: 547,191

[22] Filed: Jul. 3, 1990

[30] Foreign Application Priority Data

Jul. 7, 1989 [CH] Switzerland .................. 2537/89

[51] Int. Cl.$^5$ .................. B24D 3/00; C04B 35/10
[52] U.S. Cl. .................. 51/293; 51/309; 501/127; 501/134; 501/153
[58] Field of Search .................. 501/127, 134, 153; 51/309, 293

[56] References Cited

U.S. PATENT DOCUMENTS

| | | | |
|---|---|---|---|
| 2,278,442 | 4/1942 | Heany | 501/119 |
| 3,534,286 | 10/1970 | Holm et al. | 501/134 X |
| 4,314,827 | 2/1982 | Leitheiser et al. | 51/298 |
| 4,623,364 | 11/1986 | Cottringer et al. | 51/309 |
| 4,719,188 | 1/1988 | Koba et al. | 501/153 X |
| 4,735,926 | 4/1988 | Ando et al. | 501/127 |
| 4,744,802 | 5/1988 | Schwabel | 51/309 |
| 4,770,671 | 9/1988 | Monroe et al. | 51/309 X |
| 4,829,031 | 5/1989 | Roy et al. | 501/134 |
| 4,895,815 | 1/1990 | Olapinski | 501/134 |
| 4,900,703 | 2/1990 | Ono et al. | 501/153 X |
| 4,997,461 | 9/1989 | Markhoff-Mathay et al. | 151/298 X |

FOREIGN PATENT DOCUMENTS 3219607 5/1982 Fed. Rep. of Germany .
3604848 8/1987 Fed. Rep. of Germany .

OTHER PUBLICATIONS

"$Al_2O_3.TiO_2$ and $Al_2TiO_5$ Ceramic Materials by the Sol-Gel Process", Woignier, T., et al., J. Non-Crystalline Solids, 100, (1988), pp. 325 to 329.

*Primary Examiner*—Karl Group
*Attorney, Agent, or Firm*—Fisher, Christen & Sabol

[57] ABSTRACT

By adding very-finely-divided or highly-dispersed titanium dioxide or aluminum titanate, optionally in a mixture with aluminum oxide, sintered products of great hardness, whose fracture toughness can be adjusted over a wide range, are obtained from aluminum hydroxide according to a sol-gel process depending on the selection of the sintering conditions. The materials are especially suitable as abrasives or for the production of ceramic powder or components.

24 Claims, 7 Drawing Sheets

1μm

1μm

|—|
1 μm

|——|
10 μm

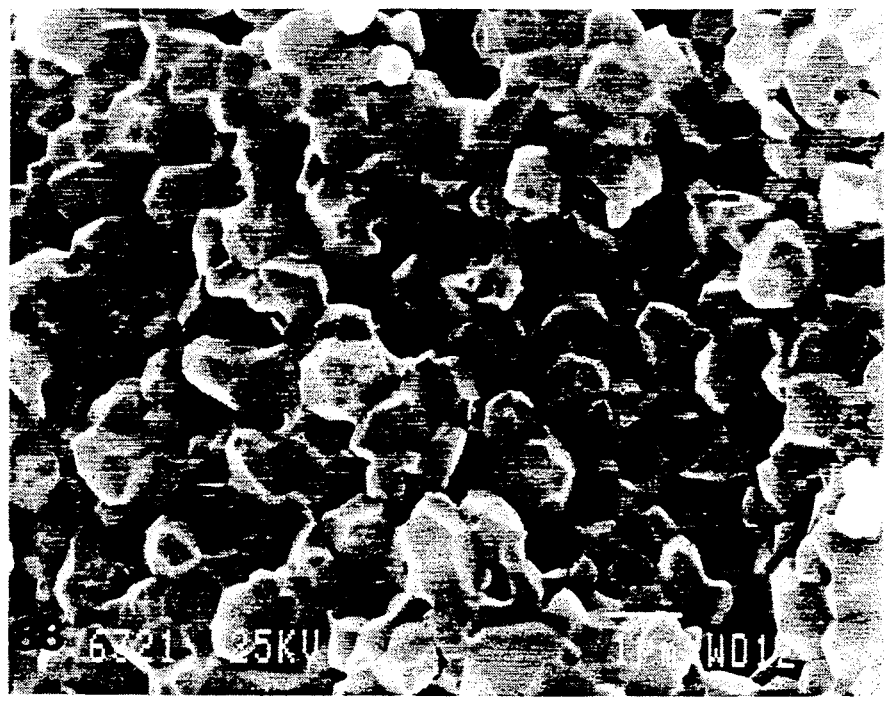
1 μm
FIG. 6
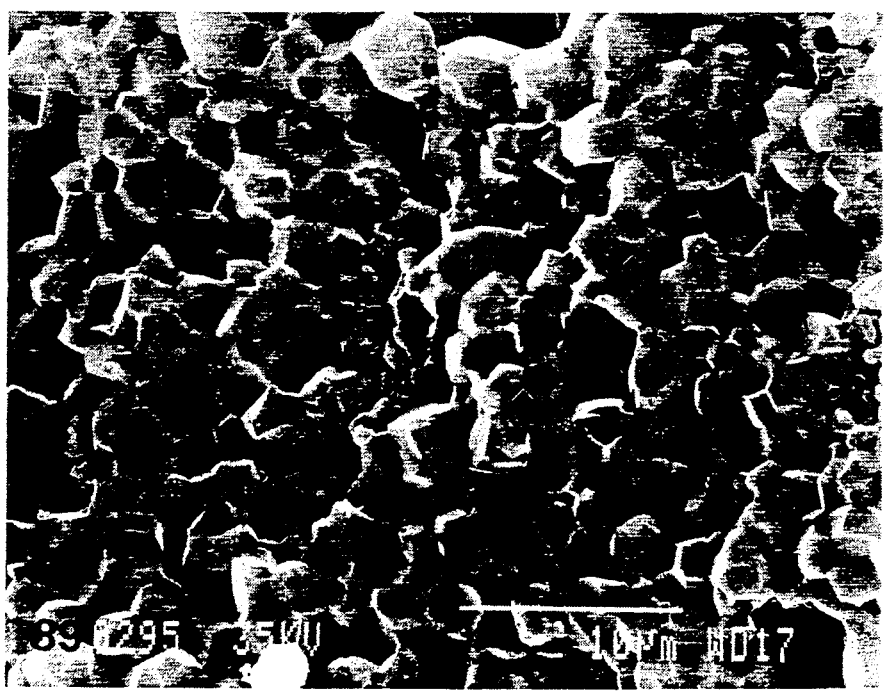
10 μm

1 μm

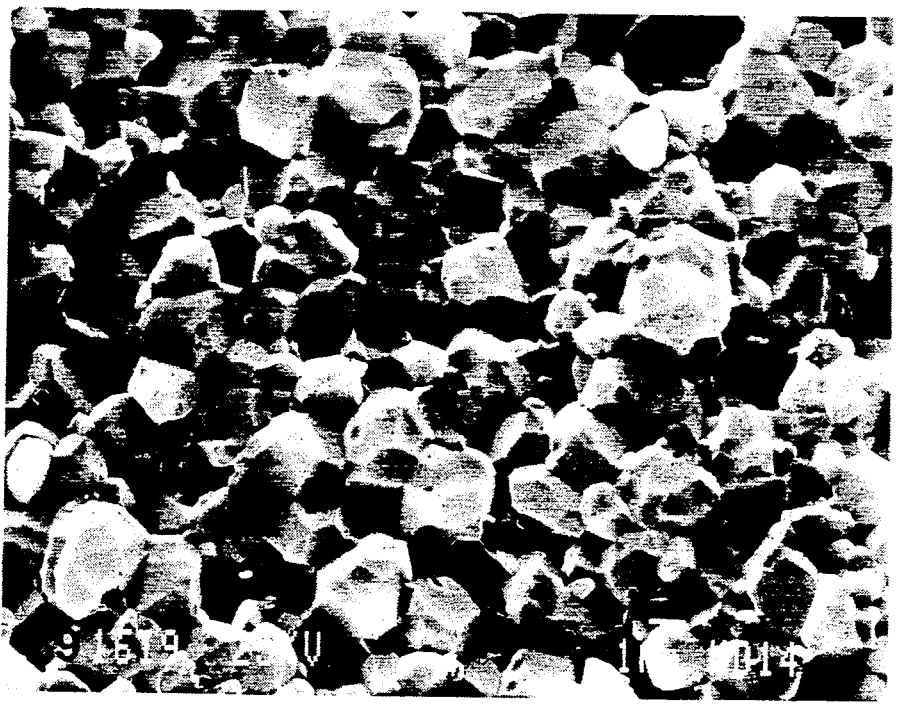
FIG. 8(b)
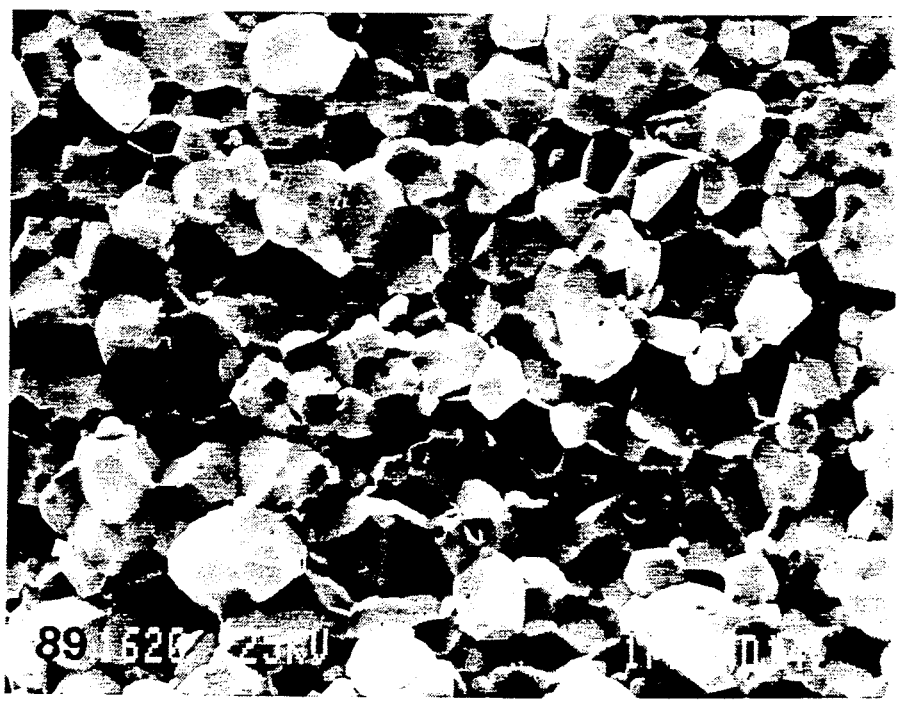
1 μm

├─┤
1 μm

├─┤
1 μm

1μm
FIG. 12
1μm

PROCESS FOR PRODUCING SINTERED MATERIAL BASED ON ALUMINUM OXIDE AND TITANIUM OXIDE

BACKGROUND OF THE INVENTION

1. Field Of The Invention

The invention relates to a sintered material based on aluminum oxide, a sol-gel process for its production, and a process for its use as an abrasive, ceramic powder or molded article.

2. Background Art

Oxidic abrasives, such as, corundum or zirconia-alumina, usually are produced by melting the oxide or oxide mixture, allowing the melt to solidify, crushing it, and grading it. Drawbacks of the process are its high energy expense and the limited possibility of influencing the mechanical properties of the product, which essentially are determined by the composition and the cooling-off conditions.

Sintered materials based on aluminum oxide also are known which are suitable for use as an abrasive. The first of these sintered products, as they are described, for example, in U.S. Pat. No. 2,278,442, were produced from pure aluminum oxide or aluminum hydroxide or from bauxite by a fine grinding, optionally adding sintering auxiliary agents or glass phase makers, compacting and sintering or hot pressing. However, it was shown that the materials thus obtained also exhibit no optimal grinding properties, since their crystallite size is, for example, in the range of 5 to 20 microns, while substantially smaller crystallites are necessary to reach a maximum hardness and toughness. In West German OS 3,604,848, it was proposed to grind alumina with additives up to a particle size of less than 0.1 micron and then to subject it to a multistage heat and sintering treatment. Although the process starts from reasonably priced raw materials, the grinding process is very expensive and its feasibility on a large scale is questionable.

The problem of comminution is avoided by the so-called sol-gel processes, which, for example, are described in U.S. Pat. No. 4,314,827 and West German OS 3,219,607. The previously known embodiments of the sol-gel process generally require the addition of magnesium oxide or a precursor of it or another compound of a spinel-forming metal.

Another known possibility is the addition of up to 60 percent by weight (calculated as $ZrO_2$ and in relation to the sintered product) of zirconium compounds. In this connection, the additives preferably are introduced in the form of soluble salts or alcoholates, which leads to a considerable amount of organic substance or inorganic acid components, such as, a nitrate, in the sols and gels formed. These compounds must be completely volatilized or decomposed in the heat treatment before the sintering. On the other hand, it is desirable to bring in the additives in the smallest possible amount, and, if possible, as an oxide or a hydroxide, so that just water must be removed before the sintering.

Further, it is desirable to be able to influence the properties of the sintered product, especially its fracture toughness and hardness, in a comparatively simple way, without using numerous different additives.

Broad Description Of The Invention

The main object of the invention is to provide a process for the production of ceramic materials based on aluminum oxide, that can be performed in a simple way and yields products with the use of comparatively small amounts of preferably oxidic additives, which are suitable as abrasives and can be influenced simply and reproducibly in their mechanical properties. Other advantages and objects of the invention are set out herein or obvious herefrom to one skilled in the art.

The objects and advantages of the invention are achieved by the processes and products of the invention.

The process of the invention involves a process for the production of sintered ceramic materials on the basis of alpha-aluminum oxide, that contains the steps of sol production, gel formation, drying, optionally crushing and grading, as well as sintering. A homogeneous sol of 90 to 99.9 percent by weight, calculated as $Al_2O_3$ and in relation to the sintered product, of an aluminum hydroxide and/or at least a precursor of alpha-aluminum oxide is produced with adding altogether 0.1 to 10 percent by weight, calculated as $TiO_2$ and in relation to the sintered product, (a) of very finely divided or highly dispersed titanium dioxide, and/or (b) very finely divided or highly dispersed aluminum titanate, and/or (c) a mixture of very finely divided or highly dispersed titanium dioxide and very finely divided or highly dispersed aluminum oxide, and/or (d) at least one precursor forming titanium dioxide and/or aluminum titanate, and optionally of one or more sintering auxiliary agents, grain growth inhibitors, nucleating agents or glass phase makers. The sintering is performed, after a preheating phase at 300° to 700° C., at a temperature of 1250° to 1500° C.

It surprisingly was found that, by an addition of titanium oxide or aluminum titanate in finely distributed form or as a mixture of both compounds or of suitable precursors to aluminum oxide or aluminum hydroxide sols produced in a way known in the art, dense bodies of great hardness and toughness and with very fine texture can be produced according to the usual working method even without other additives provided that suitable sintering conditions are maintained.

It was indeed known (T. Woignier et al., J. Non-Cryst. Solids, 100, (1988), 325–329) that dense sintering bodies can be obtained from $Al_2O_3$ and $TiO_2$ without further additives, but these consisted of equimolar amounts of $Al_2O_3$ and $TiO_2$ or of $Al_2TiO_5$ and full density was attained only by hot pressing.

The titanium dioxide added according to the invention suitably has an average particle size, expressed as $d_{50}$ value, of less than 5 microns, preferably less than 1 micron. Especially preferred is a so-called highly dispersed product, with an average primary particle size of 10 to 50 nm, produced by flame hydrolysis from anhydrous titanium tetrachloride. Such a product is, for example, obtainable from the Degussa Company under the designation Titandioxid P25 (i.e., titanium dioxide P25).

Another embodiment of the process according to the invention uses very-finely-divided aluminum titanate with an average particle size, expressed as $d_{50}$ value, of less than 5 microns, preferably less than 1 micron. Especially preferred is again a highly dispersed product with an average primary particle size of 10 to 50 nm.

Very-finely-divided titanium dioxide, such as, from hydrolyzed tetraalkoxytitaniums, obtained from other sources can be used, or a mixture of titanium dioxide and aluminum oxide (instead of aluminum titanate) can be used.

As an aluminum oxide in this case, preferably a highly dispersed aluminum oxide with an average particle size of 5 to 50 nm, which mostly consists of the gamma-modification, is used. Such highly dispersed aluminum oxides are produced by flame hydrolysis from anhydrous aluminum chloride and sold, e.g., by the Degussa Company under the designation Aluminiumoxid C (i.e., aluminum oxide C).

The titanium dioxide or the other titanium-containing additives suitably are added to aluminum oxide or aluminum hydroxide sol in such an amount that the titanium oxide content in the finished sintered product is 0.1 to 10 percent by weight. Here, the elementary analytical composition and not the phase composition is meant by the titanium dioxide content, i.e., it does not make any difference whether the titanium is present in a finished product as $TiO_2$ or $Al_2TiO_5$ or in another form. The $TiO_2$ content in the finished sintered product preferably is 1 to 5 percent by weight.

The titanium dioxide or the other titanium-containing additives suitably are dispersed intensively in the sol, to achieve as homogeneous a distribution as possible. This can be achieved by stirring with a high-speed stirrer or, for example, by treatment in a ball mill or vibration grinding mill. In sols with high solid content, the homogeneous distribution of the additives advantageously is achieved with the help of a pressure mixer, a kneader, an extruder or a similar device.

In addition to titanium dioxide or its precursors or aluminum titanate, of course, still other sintering auxiliary agents, grain growth inhibitors, nucleating agents or glass phase makers can be added. Such other additives are known from the prior art and comprise, for example, $SiO_2$, $MgO$ or $ZrO_2$ or precursors of these oxides, such as, silicic acid esters, magnesium salts, zirconyl salts or zirconium alcoholates, further $MgAl_2O_4$, $MgTiO_3$, alpha-$Fe_2O_3$, $FeAl_2O_4$, $NiO$, $NiTiO_3$, $NiAl_2O_4$, alpha-$Al_2O_3$, alpha-$Cr_2O_3$, $CeO_2$, $ZnTiO_3$, $ZnAl_2O_4$ or $Y_2O_3$. These additional additives preferably are added in amounts of 0.001 to 5 percent by weight, in relation to the sintered product, and optionally can modify the properties of the sintered material according to the invention.

The sol then is converted to a gel in a way known in the art and dried at a temperature of preferably less than 100° C. The gel formation preferably takes place by the slow addition of nitric acid, hydrochloric acid or acetic acid. Preferably it is performed in flat dishes in a layer thickness of a few centimeters. The drying preferably is performed in a drying oven and, for example, takes several days at 75° C. After the drying, the gel can be crushed in a way known in the art, and, provided that the end product is to be used as an abrasive, can be graded according to the desired grain size, in which the shrinking during the sintering process suitably is taken into consideration.

The sintering process suitably is performed in several stages. First, the dried gel is heated to a temperature of 300° to 700° C. for at least 1 hour to remove physically- and chemically-bound water and other components volatile at this temperature and to convert the hydroxides and hydrated oxides into the oxides. Then, the material thus calcined is heated further to the sintering temperature, and optionally it can be advantageous to insert a holding time before the actual sintering at a temperature somewhat below the sintering temperature, for example, of 1100° C. The sintering suitably takes place at a temperature of 1250° to 1500° C., and depending on the temperature, a holding time of a few minutes up to several hours is necessary. The optimal holding time also depends significantly on the rates of heating-up and cooling-off and must be determined by tests, as this is customary in ceramics and familiar to the expert and one skilled in the art. The sintered material thus obtained consists of crystallites, at least 95 percent of which exhibit a size of less than 4 microns, preferably less than 2 microns. It is penetrated by numerous micropores, which mainly exhibit a size of 10 to 500 nm and which are not interconnected. These micropores partly are found between the crystallites, partly in the individual crystallites. Their number can be determined based on scanning electron microscopic photos in fractured surfaces. In general, the material exhibits at least one pore per crystallite.

Fracture toughness $K_{IC}$ of this material is high because of the numerous micropores and preferably is at least 4.5 MPa·m$^{\frac{1}{2}}$. The microhardness of this material preferably is at least 16 GPa.

In the X-ray diffraction diagram of this material, the presence of a rutile phase can be seen in $TiO_2$ contents starting from about 2 percent by weight.

After the sintering, by a heat treatment at a temperature which is below the sintering temperature, preferably about 100 C. lower, and preferably lasting 1 to 8 hours, the number of micropores can be greatly reduced. It is even possible to make them largely disappear. The crystallite size increases in this process and, however, one can obtain a product with an average crystallite size of 2 microns, for example, in which at least 95 percent of the crystallites are smaller than 4 microns, and which is essentially free of micropores. By the additional heat treatment, the microhardness increases to preferably at least 18 GPa, while the fracture toughness returns to values of 2 to 2.5 MPa·m$^{\frac{1}{2}}$.

After the heat treatment, no more diffraction lines of rutile are recognizable in the X-ray diffraction diagram.

Independently of the micropores, the sintered products produced according to the invention still exhibit closed, sizable pores. The densities determined by pycnometry therefore are influenced by the degree of crushing of the samples. But for the preferred uses as abrasive or for the production of ceramic powders, this means no significant drawback.

The sintered materials according to the invention preferably are used as abrasives, and therefore both in loose form, depending on grain size, for example, as blasting grain or lapping grain, and in coated abrasives on a base such as in abrasive paper or abrasive cloth or in ceramic bonded or synthetic resin bonded abrasive wheels, such as, grinding wheels, cutting off wheels or snagging wheels. Another preferred use of the sintered materials according to the invention is for the production of ceramic powders, which are processed further into ceramic components in a way known in the art or are used as ceramic plasma spray powder. Other preferred uses of the sintered materials according to the invention are for the production of ceramic cutting tools for machining, especially of metals, as well as the production of grinding media, for example, for ball mills.

BRIEF DESCRIPTION OF THE DRAWINGS

In the drawings:

FIGS. 1 to 12 are electron microscope photographs of materials in the examples.

DETAILED DESCRIPTION OF THE INVENTION

Figure 1:
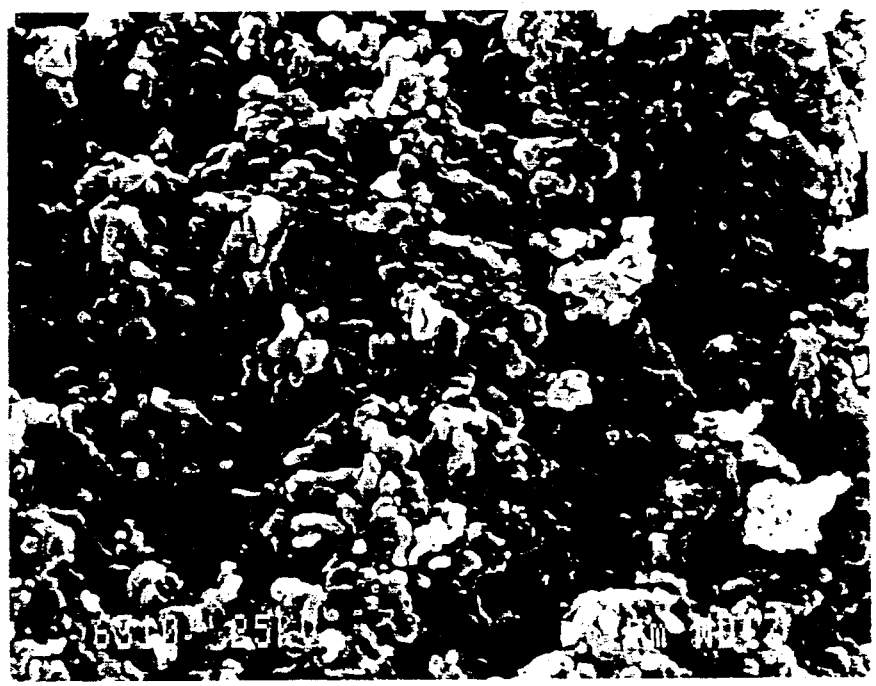
Figure 2:

The following examples illustrate the invention.

EXAMPLES 1 to 9

General Instructions:

In a mixing vat, 20 l of demineralized water (conductivity smaller than or equal to 5 microS) was introduced and 5 kg of Pural® SB (Condea Chemie GmbH) was stirred in with a propeller mixer (n=1000 min$^{-1}$). Then, the appropriate amount of highly dispersed titanium dioxide P25 (Degussa AG) was added and the low-viscosity mixture thus obtained was intensively dispersed for at least 24 hours. Then, by adding about 0.75 l of concentrated acetic acid, the pH was adjusted to 3.5, and the mixture was poured into flat dishes of a layer thickness of 2 to 3 cm. At room temperature, a punctureproof gel formed within 45 to 60 minutes, which was dried at 75° C. within 2 to 3 days in a drying oven. The dried gel was sintered in large pieces in a fast firing kiln under various conditions.

The characterizing of the sintered product took place by determining the following properties:

a) Density, pycnometrically in xylene on crushed samples of grain size 0 to 0.5 mm.

b) Microhardness according to Vickers (indentation force 1N) (on polished surfaces).

c) Macrohardness according to Vickers (indentation force 100N) (on polished surfaces).

d) Fracture toughness $K_{IC}$ according to Anstis and Niihara (on polished surfaces).

e) Crystallite and pore size by scanning electron microscope photographs of fractured surfaces (FIGS. 1 to 7).

Sintering Conditions and Results:

EXAMPLES 1 to 3

The amount of titanium dioxide P25 added was 0.1 percent by weight (Example 1), 1 percent by weight (Example 2) and 2 percent by weight (Example 3), each in relation to the Pural® used. The dried gel was heated within 1 hour to 400° C., kept at such temperature for 1 hour, then heated within 30 minutes to 1100° C., kept at such temperature for 3 hours, heated within 30 minutes to the end temperature of 1300° C., kept at such temperature for 15 minutes and finally cooled off. The properties of the materials thus obtained are compiled in Table 1:

TABLE 1

| | Example 1 | Example 2 | Example 3 |
|---|---|---|---|
| Amount of TiO$_2$ [% by weight] added in relation to Pural® SB | 0.1 | 1 | 2 |
| Density [g/cm3] | 3.4 | 3.61 | 3.69 |
| Microhardness [GPa] | 4.5 | 17.9 | 18.4 |
| Macrohardness [GPa] | nd | 15.1 | 15.7 |
| K$_{IC}$ [MPa · m$^{\frac{1}{2}}$] | nd | 4.6 | 5.1 |
| Average crystallite size [microns] | wormlike d = 0.4 | 0.7 | 0.7 |

NOTE: nd = not determined

Scanning electron microscope photos of fractured surfaces of the products according to Examples 1 and 3 (FIGS. 1 and 2) illustrate the structure of the sintered materials.

EXAMPLES 4 to 6

The amount of titanium dioxide P25 added was 2 percent by weight (Example 4), 3.5 percent by weight (Example 5) and 5 percent by weight (Example 6), each in relation to the Pural® used. The dried gel was heated with 1 hour to 400° C. and kept at such temperature for 1 hour. Then, it was heated within 30 minutes to 1330° C., kept at such temperature for 5 minutes and cooled off. The properties of the materials thus obtained are compiled in Table 2:

TABLE 2

| | Example 4 | Example 5 | Example 6 |
|---|---|---|---|
| Amount of TiO$_2$ [% by weight] added in relation to Pural® SB | 2 | 3.5 | 5 |
| Density [g/cm3] | 3.65 | 3.85 | 3.79 |
| Microhardness [GPa] | 18.0 | 19.0 | 18.5 |
| Macrohardness [GPa] | 16.5 | 15.0 | 16.5 |
| K$_{IC}$ [MPa · m$^{\frac{1}{2}}$] | 5.7 | 4.9 | 5.2 |
| Average crystallite size [microns] | 1.0 | 1.0 | 1.5 |
| Average micropore size [microns] | 0.15 | 0.15 | 0.15 |

EXAMPLES 7 to 9

The amount of titanium dioxide P25 added was 2 percent by weight (Example 7), 3.5 percent by weight (Example 8), and 5 percent by weight (Example 9), each in relation to the Pural® used. The procedure was as in Examples 4 to 6; however, after the holding time of 5 minutes at 1330° C., the material was not immediately cooled off to room temperature, but kept at 1250° C. for another 5 hours. The micropores in the sintered product thus substantially disappeared. The other properties of the materials thus obtained are compiled in Table 3:

TABLE 3

| | Example 7 | Example 8 | Example 9 |
|---|---|---|---|
| Amount of TiO$_2$ [% by weight] added in relation to Pural® SB | 2 | 3.5 | 5 |
| Density [g/cm3] | 3.66 | 3.84 | 3.80 |
| Microhardness [GPa] | 19.6 | 20.0 | 19.4 |
| Macrohardness [GPa] | 16.4 | 15.2 | 16.5 |
| K$_{IC}$ [MPa · m$^{\frac{1}{2}}$] | 2.1 | 2.0 | 2.5 |
| Average crystallite size [microns] | 2.0 | 2.0 | 2.5 |
| Average micropore size [microns] | none | none | none |

EXAMPLES 10 and 11

The production of gel took place as described in Examples 1 to 9; however, instead of the highly dispersed titanium dioxide, an equimolar mixture of highly dispersed aluminum oxide C (Degussa AG) and titanium dioxide P25 (Degussa AG) corresponding to a composition of 56 percent by weight of Al$_2$O$_3$ and 44 percent by weight of TiO$_2$, was used. The total amount of this additive mixture was 2 percent by weight, in relation to the weighted sample of Pural® SB.

Sintering Conditions and Results:

EXAMPLE 10

Figure 3:
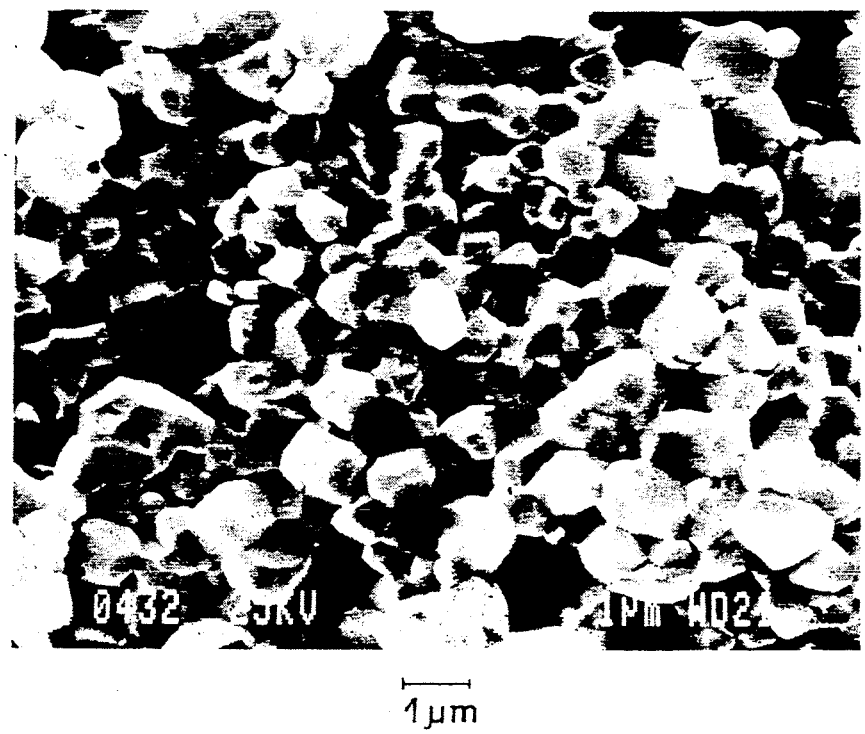

The dried gel was heated within 1 hour to 400° C., kept at this temperature for 1 hour, heated to 730° C. within 10 minutes and kept at this temperature for 30 minutes. Within 30 minutes, the temperature was increased to 1100° C. and kept at this level for 1 hour, after that, the end temperature of 1310° C. was reached within 30 minutes and kept for another 10 minutes and finally cooled off to room temperature. FIG. 3 shows a scanning electron microscope photograph of a fractured surface in the product. The properties of the product thus obtained are compiled in Table 4:

TABLE 4

| | |
|---|---|
| Density [g/cm3] | 3.66 |
| Microhardness [GPa] | 19.0 |
| Macrohardness [GPa] | 15.2 |
| $K_{IC}$ [MPa · m$^{\frac{1}{2}}$] | 5.1 |
| Average crystallite size [microns] | 0.7 |
| Average micropore size [microns] | 0.15 |

EXAMPLE 11

Figure 4:
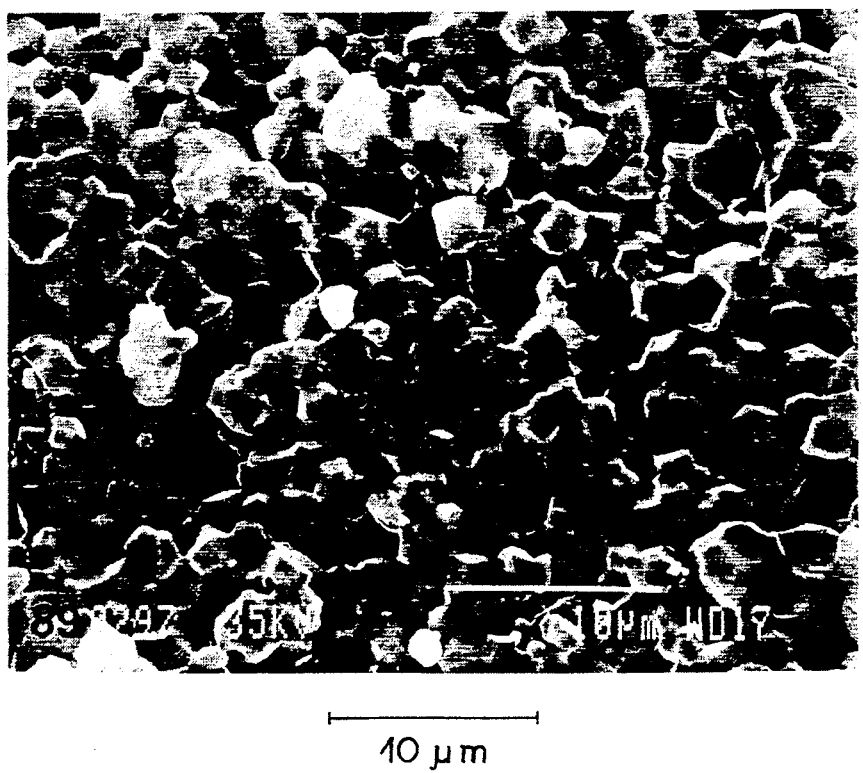

The control of the temperature took place as described in Example 10; however, the material before the cooling off was kept at a temperature of 1250° C. for another 5 hours. The micropores substantially disappeared in this subsequent treatment. A scanning electron microscope photograph of a fractured surface of the material is shown in FIG. 4. The other properties of the materials thus obtained are found in Table 5:

TABLE 5

| | |
|---|---|
| Density [g/cm3] | 3.66 |
| Microhardness [GPa] | 20.2 |
| Macrohardness [GPa] | 15.4 |
| $K_{IC}$ [MPa · m$^{\frac{1}{2}}$] | 2.4 |
| Average crystallite size [microns] | 2.5 |
| Average micropore size [microns] | no micropores |

EXAMPLES 12 and 13

The production of gel took place as described in Examples 10 and 11; instead of the dispersing of the sol with a stirrer, a fine grinding was performed in a vibration grinding mill with aluminum oxide balls (at least 97% $Al_2O_3$, d ~ 1.5 to 2 cm). The grinding duration was 30 minutes; the weight ratio of the grinding balls to the Pural ® used was about 10:1. The sintering conditions were the same as in Examples 10 and 11. FIGS. 5 and 6 show scanning electron microscope photographs of fractured surfaces of the materials. The properties of the products thus obtained are compiled in Table 6:

TABLE 6

| | Example 12 Without subsequent treatment at 1250° C. | Example 13 With subsequent treatment at 1250° C. |
|---|---|---|
| Density [g/cm3] | 3.7 | 3.7 |
| Microhardness [GPa] | 19.2 | 20.7 |
| Macrohardness [GPa] | 16.0 | 16.1 |
| $K_{IC}$ [MPa · m$^{\frac{1}{2}}$] | 4.9 | 2.2 |
| Average crystallite size [microns] | 0.9 | 2.5 |
| Average micropore size [microns] | 0.15 | none |

EXAMPLES 14-15

Figure 7:
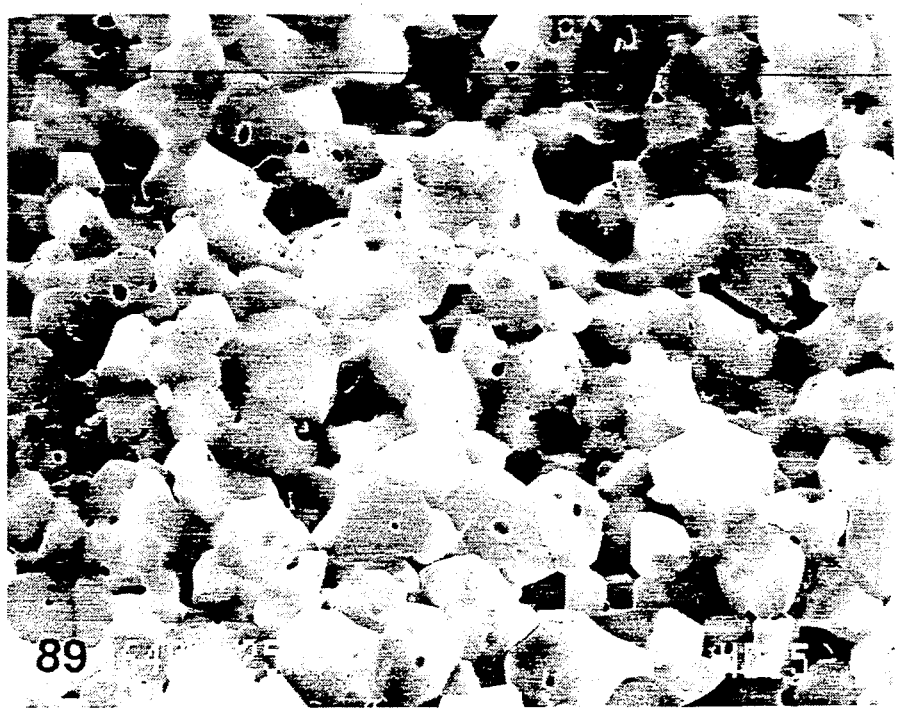

The production of gel took place as described in Examples 1 to 9; instead of the highly dispersed titanium dioxide, 2 percent by weight (in relation to the amount used on Pural ®) of aluminum titanate powder (H. C. Starck, grain size 0 to 10 microns, $d_{50}$=4.5 microns) was used. The dried gel was heated to 400° C. within 1 hour, kept at such temperature for 1 hour, then heated to 1450° C. within 30 minutes, kept at such temperature for 10 minutes and finally immediately (Example 14) or after 5 hours at 1250° C. (Example 15) cooled off to room temperature. A scanning electron microscope photograph of a fractured surface of the product of Example 14 is shown in FIG. 7. The properties of the products thus obtained are compiled in Table 7:

TABLE 7

| | Example 14 Without subsequent treatment at 1250° C. | Example 15 With subsequent treatment at 1250° C. |
|---|---|---|
| Density [g/cm3] | 3.76 | 3.75 |
| Microhardness [GPa] | 19.1 | 20.0 |
| Macrohardness [GPa] | 15.0 | 15.0 |
| $K_{IC}$ [MPa · m$^{\frac{1}{2}}$] | 6.1 | 2.4 |
| Average crystallite size [microns] | 2.0 | 3.0 |
| Average micropore size [microns] | 0.2 | none |

EXAMPLE 16

In a mixing vat, 300 ml of demineralized water, 100 g of Pural ® SB, 3 g of titanium dioxide P25, 0.53 g of magnesium acetate (tetrahydrate) and 3 ml of glycerin were intensively dispersed within 20 hours. Then, the low-viscosity mixture with about 12 ml of concentrated acetic acid was adjusted to a pH of about 3.5 and poured on a drying tray with a layer thickness of about 3 cm. The gelling took place within about 45 minutes at room temperature. The gel was dried in the drying oven at 80° C. The dried gel was heated in a fast firing kiln to 400° C. within 1 hour, kept at such temperature for 1 hour, then heated to 700° C. within 1 hour and kept at such temperature for 30 minutes and finally heated to 1310° C. within 1 hour, kept at such temperature for 10 minutes and cooled off. A scanning electron microscope photograph of a fractured surface of the product of Example 16 is shown in FIG. 8. The properties of the product are compiled in Table 8:

TABLE 8

| | |
|---|---|
| Density [g/cm3] | 3.72 |
| Microhardness [GPa] | 21.4 |
| Macrohardness [GPa] | 15.0 |
| $K_{IC}$ [MPa · m$^{\frac{1}{2}}$] | 5.5 |
| Average crystallite size [microns] | 2.5 |
| Average micropore size [microns] | 0.2 |

EXAMPLES 17 to 20

General Instructions:

In a mixing vat, 400 ml of diluted hydrochloric acid (0.74 percent by weight) was introduced, 100 g of Disperal ® and optionally the additives were added, and intensively stirred for about 50 minutes. The gel formation took place at room temperature after about 2 hours. The gel was dried at 80° C. within about 72 hours and then heated to 200° C. in a drying oven for about another 4 hours. The dried gel was heated to 400° C. within 1 hour, kept at such temperature for 1 hour, then heated to 700° C. within 1 hour and kept at such temperature for 30 minutes and finally heated to 1350° C within 1 hour, kept at such temperature for 15 minutes and cooled off.

EXAMPLE 17

(comparison example)

Disperal ® without additives.

EXAMPLE 18

Disperal ® with 2 percent by weight of titanium dioxide P25.

EXAMPLE 19

Disperal ® with 1.12 percent by weight of aluminum oxide C and 0.88 percent by weight of titanium dioxide P25.

EXAMPLE 20

Disperal ® with 2 percent by weight of aluminum titanate (H. C. Starck).

Figure 9:
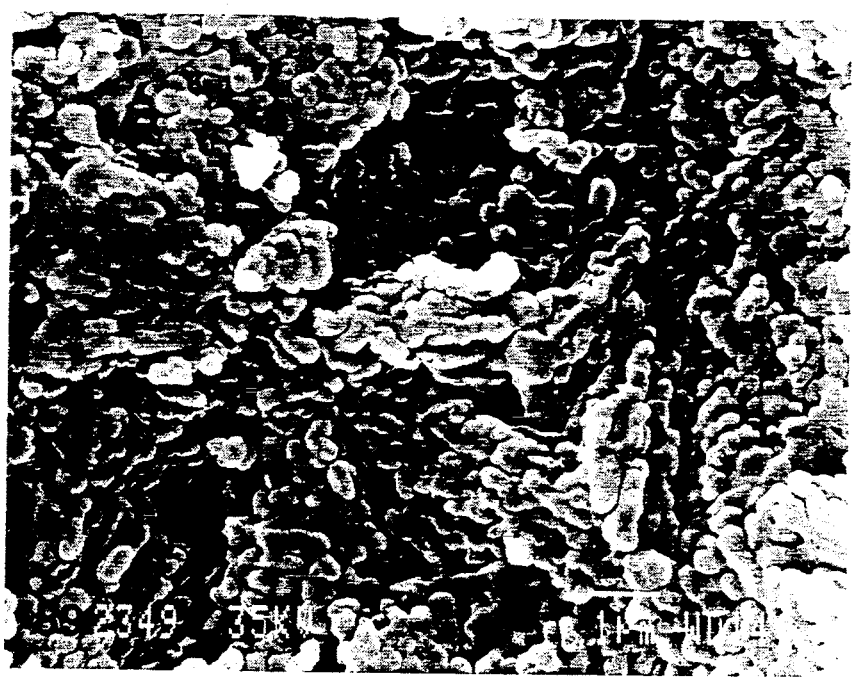
Figure 10:
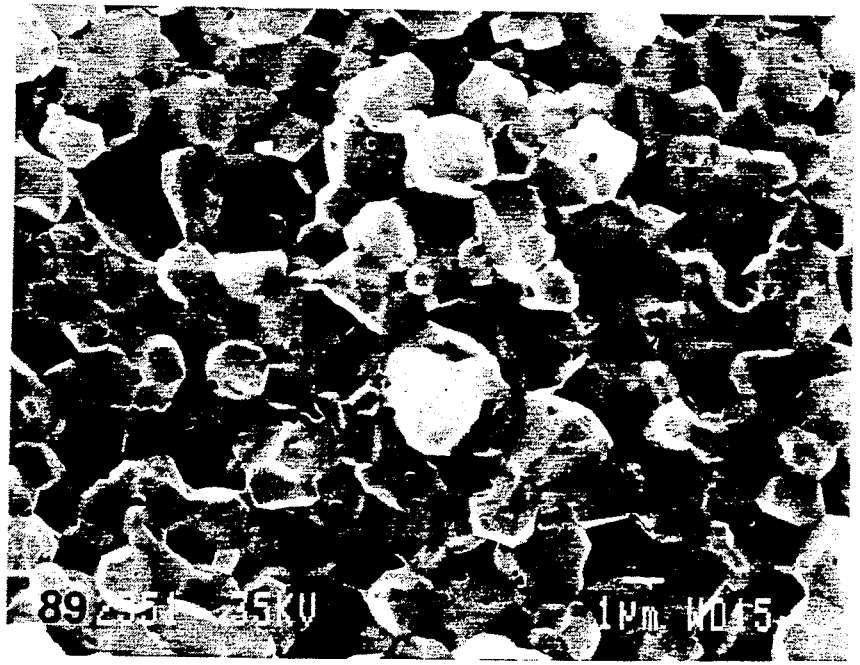

Scanning electron microscopic photographs of fractured surfaces of the materials are shown in FIG. 9 (Example 17), FIG. 10 (Example 18), FIG. 11 (Example 19) and FIG. 12 (Example 20). The properties of the sintered products thus obtained are compiled in Table 9:

TABLE 9

|  | Example 17 | Example 18 | Example 19 | Example 20 |
| --- | --- | --- | --- | --- |
| Density [g/cm3] | 3.75 | 3.81 | 3.69 | 3.69 |
| Microhardness [GPa] | nd (porous) | 19.2 | 18.7 | 20.2 |
| Macrohardness [GPa] | nd (porous) | 15.7 | 15.0 | 15.0 |
| $K_{IC}$ [MPa · m$^{\frac{1}{2}}$] | nd (porous) | 4.7 | 4.8 | 4.2 |
| Average crystallite size [microns] | about 1 wormlike | 2.5 | 1 | 1 |
| Average micropore size [microns] | — | 0.25 | 0.2 | 0.2 |

NOTE: nd = not determined

EXAMPLE 21

From the dried gel produced according to Example 4 with 2 percent by weight of TiO$_2$, the grain fraction smaller than 200 microns was screened out and calcined at 1200° to 1300° C. for 4 hours. The calcined product, which was over 80 percent of alpha-Al$_2$O$_3$, was attrited in an attrition mill with alpha-Al$_2$O$_3$ grinding media (d=2 mm) with adding 0.2 percent by weight of magnesium oxide in water for about 2 hours, so that a suspension with about 35 percent solid content resulted. The average particle size (d$_{50}$ value) was about 0.4 micron. The suspension was dehydrated in a filter press; the filter cake was dried. With the sinterable powder thus obtained, a slip was produced according to the following formulation:

80 parts by weight of powder and 20 parts by weight of demineralized water were dispersed with 0.7 parts by weight of Dolapix ® CE 64 (manufacturer Zschimmer & Schwarz Company) and 0.2 parts by weight of polyvinyl alcohol in a drum mill with Al$_2$O$_3$ grinding balls (d=15 mm) for 3 hours. The weight ratio of the powder:grinding balls was about 1:2. The slip was subjected to a wet sifting (screen underflow smaller than 53 microns), to separate a coarse agglomerate, and was poured into plaster molds for crucibles with about a 50 mm diameter and about a 50 mm height and a wall thickness of 2 to 3 mm. The green compacts were dried at 100° C. and sintered at 1350° C. for 15 minutes. The overall linear shrinkage during drying and sintering was about 26 percent. The crucible thus obtained showed the following properties:

sintering density: larger than 99 percent of the theoretical density microhardness: 20 GPa $K_{IC}$: 5–6 MPa·m$^{\frac{1}{2}}$ According to the same process, sample rods for the measurement of the bending strength were produced and ground to a cross section of 4×4 mm. The measured bending strength (4-point bending test, distance of the supports 40 mm, distance of the stress points 20 mm) was 700 to 750 MPa.

EXAMPLE 22

The procedure was as described in Example 21, however, a spray dryer was used instead of a filter press. The properties of the products thus obtained were identical (within the margin of error) to those of Example 21.

What is claimed is:

1. Process for the production of a sintered, alpha-aluminum oxide, ceramic material comprising:
   (A) producing a homogeneous sol of
      (i) 90 to 99.9 percent by weight, calculated as Al$_2$O$_3$ and in relation to said sintered, alpha-aluminum oxide, ceramic material, of at least one precursor of alpha-aluminum oxide,
      (ii) 0.1 to 10 percent by weight, calculated as TiO$_2$ and in relation to said sintered, alpha-aluminum oxide, ceramic material, of at least one member from the group consisting of:
         (a) titanium dioxide having a particle size of less than 5 microns in d$_{50}$ value,
         (b) aluminum titanate having a particle size of less than 5 microns in d$_{50}$ value,
         (c) a mixture of titanium dioxide having a particle size of less than 5 microns in d$_{50}$ value and aluminum oxide having a particle size of less than 5 microns in d$_{50}$ value,
         (d) a precursor forming titanium dioxide, and
         (e) a precursor forming aluminum titanate, said precursor being other than a mixture of aluminum oxide and titanium dioxide, and
      (iii) a sufficient amount of water to form homogeneous sol (A);
   (B) forming a gel from homogeneous sol (A);
   (C) drying gel (B);
   (D) preheating dried gel (C) at a temperature of 300° to 700° C. for at least one hour; and
   (E) sintering preheated, dried gel (D) at a temperature of 1250° to 1500° C. to provide said sintered, alpha-aluminum oxide, ceramic material.

2. The process according to claim 1 wherein homogeneous sol (A) is produced with the adding of titanium dioxide with an average primary particle size of 10 to 50 nm.

3. The process according to claim 1 wherein homogeneous sol (A) is produced with the adding of titanium dioxide in a mixture with aluminum oxide, having an average primary particle size of 10 to 50 nm.

4. The process according to claim 1 wherein homogeneous sol (A) is produced with the adding of aluminum titanate with an average primary particle size of 10 to 50 nm.

5. The process according to claim 1 wherein the precursor of alpha-$Al_2O_3$ is very finely divided boehmite.

6. The process according to claim 1 wherein homogeneous sol (A) is produced with the adding of at least one additive member from the group consisting of $SiO_2$, at least one $SiO_2$ precursor, MgO, at least one MgO precursor, $ZrO_2$, at least one $ZrO_2$ precursor, $MgAl_2O_4$, $MgTiO_3$, alpha-$Fe_2O_3$, $FeAl_2O_4$, NiO, $NiTiO_3$, $NiAl_2O_4$, alpha-$Al_2O_3$, alpha-$Cr_2O_3$, $CeO_2$, $Y_2O_3$, $ZnTiO_3$ and $ZnAl_2O_4$.

7. The process according to claim 6 wherein homogeneous sol (A) is produced with the adding of 0.001 to 5.0 percent by weight, in relation to said sintered, alpha-aluminum oxide, ceramic material, of said at least one additive member, said at least one additive member being selected from the group consisting of $SiO_2$, at least one $SiO_2$ precursor, MgO, at least one MgO precursor, $ZrO_2$, at least one $ZrO_2$ precursor, $MgAl_2O_4$, $MgTiO_3$, alpha-$Fe_2O_3$, $FeAl_2O_4$, NiO, $NiTiO_3$, $NiAl_2O_4$, alpha-$Al_2O_3$, alpha-$Cr_2O_3$, $CeO_2$, $Y_2O_3$, $ZnTiO_3$ and $ZnAl_2O_4$.

8. The process according to claim 1 wherein dried gel (C) is crushed and graded before dried gel (C) is sintered.

9. The process according to claim 1 wherein the sintering is performed at atmospheric pressure.

10. The process according to claim 1 wherein, after the sintering, the sintered ceramic material is subsequently treated at a temperature of 800° to 1300° C., but at least 20° C. below the sintering temperature, until at least part of the micropores present after the sintering has disappeared.

11. The process according to claim 10 wherein the sintering is performed at atmospheric pressure.

12. The process according to claim 11 wherein homogeneous sol (A) is produced with the adding of titanium dioxide with an average primary particle size of 10 to 50 nm.

13. The process according to claim 12 wherein homogeneous sol (A) is produced with the adding of titanium dioxide in a mixture with aluminum oxide, having an average primary particle size of 10 to 50 nm.

14. The process according to claim 11 wherein homogeneous sol (A) is produced with adding the aluminum titanate with an average primary particle size of 10 to 50 nm.

15. The process according to claim 11 wherein homogeneous sol (A) is produced with the adding of 0.001 to 5.0 percent by weight, in relation to said sintered ceramic material, of said at least one additive member, said at least one additive member being selected from the group consisting of $SiO_2$, at least one $SiO_2$ precursor, MgO, at least one MgO precursor, $ZrO_2$, at least one $ZrO_2$ precursor, $MgAl_2O_4$, $MgTiO_3$, alpha-$Fe_2O_3$, $FeAl_2O_4$, NiO, $NiTiO_3$, $NiAl_2O_4$, alpha-$Al_2O_3$, alpha-$Cr_2O_3$, $CeO_2$, $Y_2O_3$, $ZnTiO_3$ and $ZnAl_2O_4$.

16. The process according to claim 11 wherein the precursor of alpha-$Al_2O_3$ is very finely divided boehmite.

17. The process according to claim 1 when the precursor of alpha-aluminum oxide is aluminum hydroxide.

18. The process according to claim 17 wherein the aluminum hydroxide is alpha-aluminum hydroxide.

19. The process according to claim 11 wherein the precursor of alpha-aluminum oxide is aluminum hydroxide.

20. The process according to claim 19 wherein the aluminum hydroxide is alpha-aluminum hydroxide.

21. Process for the production of a sintered, alpha-aluminum oxide, ceramic material consisting of:
(A) producing a homogeneous sol of
  (i) 90 to 99.9 percent by weight, calculated as $Al_2O_3$ and in relation to said sintered, alpha-aluminum oxide, ceramic material, of at least one precursor of alpha-aluminum oxide,
  (ii) 0.1 to 10 percent by weight, calculated at $TiO_2$ and in relation to said sintered, alpha-aluminum oxide, ceramic material, of at least one member from the group consisting of:
    (a) titanium dioxide having a particle size of less than 5 microns in $d_{50}$ value,
    (b) aluminum titanate having a particle size of less than 5 microns in $d_{50}$ value,
    (c) a mixture of titanium dioxide having a particle size of less than 5 microns in $d_{50}$ value and aluminum oxide having a particle size of less than 5 microns in $d_{50}$ value,
    (d) a precursor forming titanium dioxide, and
    (e) a precursor forming aluminum titanate, said precursor being other than a mixture of aluminum oxide and titanium dioxide, and
  (iii) a sufficient amount of water to form homogeneous sol (A);
(B) forming a gel from homogeneous sol (A);
(C) drying gel (B);
(D) preheating dried gel (C) at a temperature of 300° to 700° C. for at least one hour; and
(E) sintering preheated, dried gel (D) at a temperature of 1250° to 1500° C. to provide said sintered, alpha-aluminum oxide, ceramic material.

22. Process for the production of a sintered, alpha-aluminum oxide, ceramic material comprising:
(A) producing a homogeneous sol of
  (i) 90 to 99.0 percent by weight, calculated as $Al_2O_3$ and in relation to the sintered of at least one, alpha-aluminum oxide, ceramic material precursor of alpha-aluminum oxide,
  (ii) 0.001 to 5.0 percent by weight, in relation to said sintered ceramic material, of said at least one additive member, said at least one additive member being selected from the group consisting of $SiO_2$, at least one $SiO_2$ precursor, MgO, at least one MgO precursor, $ZrO_2$, at least one $ZrO_2$ precursor, $MgAl_2O_4$, $MgTiO_3$, alpha-$Fe_2O_3$, $FeAl_2O_4$, NiO, $NiTiO_3$, $NiAl_2O_4$, alpha-$Al_2O_3$, alpha-$Cr_2O_3$, $CeO_2$, $Y_2O_3$, $ZnTiO_3$ and $ZnAl_2O_4$,
  (iii) 0.1 to 1 percent by weight, calculated as $TiO_2$ and in relation to the sintered, alpha-aluminum oxide, ceramic material, of at least one member from the group consisting of:
    (a) titanium dioxide having a particle size of less than 5 microns in $d_{50}$ value,
    (b) aluminum titanate having a particle size of less than 5 microns in $d_{50}$ value,
    (c) a mixture of titanium dioxide and aluminum oxide having a particle size of less than 5 microns in $d_{50}$ value,
    (d) a precursor forming titanium dioxide, and (e) a precursor forming aluminum titanate, said precursor being other than a mixture of aluminum oxide and titanium dioxide, and (iv) a sufficient amount of water to form homogeneous sol (A);

(B) forming a gel from homogeneous sol (A);

(C) drying gel (B);

(D) preheating dried gel (C) at a temperature of 300° to 700° C. for at least one hour; and (E) sintering preheated, dried gel (D) at a temperature of 1250° to 1500° C. to provide said sintered, alpha-aluminum oxide, ceramic material.

23. The process according to claim 21 wherein the precursor of alpha-aluminum oxide is aluminum hydroxide.

24. The process according to claim 22 wherein the precursor of alpha-alumina oxide is aluminum hydroxide.

* * * * *